Figure 1:
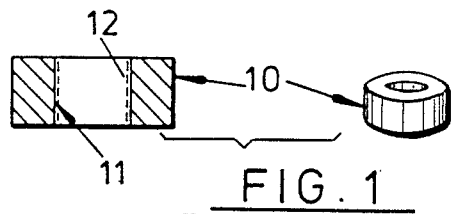

United States Patent [19]

High

[11] Patent Number: 4,932,460

[45] Date of Patent: Jun. 12, 1990

[54] COMPOSITE CASTING OF BEARING ALLOYS TO BUSHES

[75] Inventor: Raymond W. High, Riding Mill, England

[73] Assignee: Vickers PLC, London, England

[21] Appl. No.: 332,170

[22] Filed: Apr. 3, 1989

[51] Int. Cl.$^5$ .............................................. B22D 19/08
[52] U.S. Cl. ..................................... 164/105; 164/98; 164/122.1
[58] Field of Search ................ 164/98, 100, 101, 102, 164/103, 104, 105, 112, 122, 122.1

[56] References Cited

U.S. PATENT DOCUMENTS

| | | | |
|---|---|---|---|
| 3,995,357 | 12/1976 | Boggs et al. | 164/103 |
| 4,023,611 | 5/1977 | Clemens et al. | 164/112 |
| 4,117,580 | 10/1978 | Heck | 164/100 |
| 4,200,514 | 4/1980 | Schaale | 164/112 |

Primary Examiner—Richard K. Seidel
Attorney, Agent, or Firm—Stephen G. Rudisill

[57] ABSTRACT

Bearing alloy is applied to a bush (10) by mounting the bush (10) on a support structure (14) having an upstanding mandrel (17) so as to form an annular interspace (20) for reception of the bearing alloy in liquid form. The mandrel (17) projects above the bush (10) and has certain predetermined minimum dimensions. Infrared heating is applied to the bush (10) and the mandrel (17) sufficient to prevent the liquid bearing alloy freezing on contact with any of the surfaces defining the interspace (20). After degassing the liquid alloy is controllably cooled by coolant applied to the exterior of the bush (10) and finally the metalled bush is freed from the support structure (14).

5 Claims, 1 Drawing Sheet

COMPOSITE CASTING OF BEARING ALLOYS TO BUSHES

This invention relates to the application of bearing alloy to bushes. The bushes may be full arc (360°) or partial arc (e.g. 90°, 120°, 180°) and the bearing alloy may be for example tin or lead based white metal, or any metallic bearing alloy.

According to the present invention there is provided a method of applying bearing alloy to bushes, said method comprising fitting the bush to a support structure having on its base an arc formation into which the bush seats, the support structure having a mandrel centralised with respect to the arc formation projecting upwardly from the base and extending above the height of the seated bush by a predetermined amount, applying laterally directed infrared heating rays to the support structures and bush for a time interval predetermined by the radial thickness of the bush and the mass of the mandrel, the projection of the mandrel above the bush being predetermined so that the projected area thereof exposed to the infrared heating rays is at least as great as the projected area of the bush exposed to the infrared heating rays, and subsequently pouring molten bearing alloy into the interspace between the bush and mandrel, thereafter cooling the exterior surface of the bush to solidify the bearing alloy to the bush and subsequently freeing the metalled bush from the support structure.

Preferably the support structure is made of aluminium, aluminium bronze or stainless steel, all of which materials are infrared absorbing.

It is preferred that infrared heating rays are emitted by an opposed pair of flat surface infrared heaters, having a 36 KW rating or greater and emitting short or medium wave-length radiation.

It is preferred that the body of molten bearing alloy within the interspace between the bush and mandrel is degassed by means of a puddle stick.

It is preferred that cooling of the bush is undertaken by directing jets of water-based coolant against the external surface of the bush. The coolant may be an air jet containing water in sufficient quantity to provide controlled directional solidification of the molten alloy by vaporisation of the water. The jet may have an excess of water or be composed of water in which case the support structure and bush are carried by an apertured tray to enable water flow to be removed rapidly from the base of the support structure through the apertures in the tray so as to avoid over-rapid cooling of the molten alloy in that part of the interspace which is adjacent the base of the support structure.

FIGS. 1-5 illustrate sequential steps of the preferred method of applying white-metal to bushes.

Figure 2:
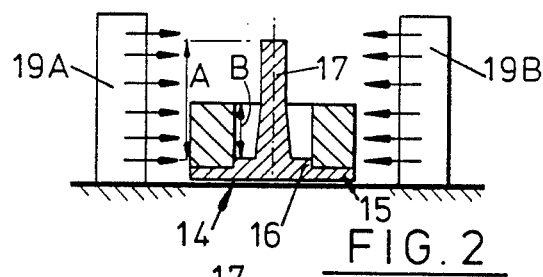
Figure 3:
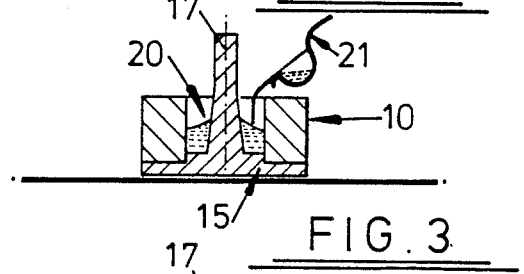

In the drawings FIG. 1 illustrates a typical full arc bush 10 made of gun metal, steel or cast iron. The inner face 11 of bush 10 may be provided with a coating 12 of bonding material in the form of tin applied in conventional manner by fluxing face 11 and dipping the bush 10 into a bath of molten tin. After the coating 12 has solidified the tinned bush is fitted to a support structure 14 shown in FIG. 2. Structure 14 has a flange-like base 15 stepped at 16 to define an arc formation in the form of a locating ring onto which the bush 10 seats and a centralised mandrel 17 projecting upwardly from the base 15, the height A of mandrel 17 being greater than the height B of the bush 10. As is also illustrated in FIG. 2 the structure 14 carrying the bush 10 is loaded into an infrared heating oven having an opposed pair of infrared flat surface heaters 19A, 19B, arranged to radiate towards each other and accordingly laterally with respect to structure 14 and bush 10. Heating within the oven by heaters 19A, 19B, is applied for a time interval which is predetermined by the radial thickness of the bush 10 and the mass of the mandrel 17 for the purpose of heating both the bush 10 and the mandrel 17 to a temperature sufficient thereafter to enable molten-white-metal to be poured from a ladle 21 as schematically shown in FIG. 3 into the interspace 20 between the bush 10 and the mandrel 17 without the molten-white-metal freezing (i.e. solidifying on contact with any of the surfaces defining the interspace 20). It has been found that this time interval is directly proportional to the radial thickness of the bush 10.

In accordance with the present invention to ensure that freezing of the white-metal applied to the interspace 20 is avoided on contact with the mandrel 17 the height A of mandrel 17 exceeds the height B of bush 10 so that the projecting height of mandrel 17 (i.e. the difference between the distances A and B) is exposed to the infrared heating rays emitted by heaters 19A, 19B, and conducts heat to that part of the mandrel lying within the bush 10 sufficient to heat at least the surface thereof to the same temperature as is attained by the bush 10. This is achieved by selecting the projection of the mandrel 17 above the bush 10 so that the projected area thereof which is exposed to the infrared heating rays is at least as great as the projected area of the bush 10 exposed to the infrared heating rays. The projected area of the mandrel projection is the distance A minus B multiplied by the diameter of the mandrel. The projected area of the bush 10 is the distance B multiplied by the outside diameter of the bush 10.

Figure 4:
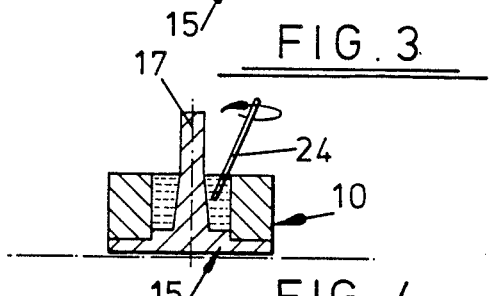

After the white-metal is poured into the interspace 20 it may be necessary to degas the volume of molten-white-metal by agitation of a puddle stick 24 as shown in FIG. 4. However if the white-metal is carefully poured from the ladle 21 entrapment of gases within the body of molten-white-metal may be avoided.

Figure 5:
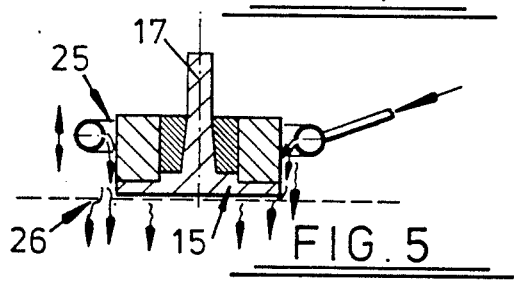

The molten-white-metal in interspace 20 is subsequently cooled to form a solidified body of white-metal adherent to the tin coating 12 on bush 10 by means of an axially moveable apertured coolant ring 25 as shown in FIG. 5. The structure 14 carrying bush 10 is supported by a perforated tray 26 and coolant from ring 25 is applied only to the exterior surface of bush 10, the coolant comprising water entrained in air jets and excess water being drained off through the apertures of tray 26 so as to minimise the cooling effect on base 15 for the purpose of avoiding over rapid solidification of the white-metal adjacent the base 15. Initially ring 25 is moved upwardly from tray 26 so that the cooling effect is applied a the bottom of the body of molten alloy.

When the white-metal is sufficiently cooled the structure 14 is removed by impacting or knocking out to leave the bush 10 with its white-metalled coating the surface of which may be subjected to minor machining operations if so required.

It will be understood that structure 14 is dimensioned particularly in relation to the bush 10. Firstly shoulder 16 is dimensioned to provide a seal to the interspace 20 when the components are heated by virtue of shoulder 16 expanding into engagement with the inner surface 11 of the bush 10. The height A of mandrel 17 is also dictated primarily by the height B of bush 10 and the diameter of mandrel 17 is dictated by the thickness of white-metal coating to be applied to the bush 10. Accordingly for a range of differently sized bushes 10 there is a need to provide a range of differently sized structures 14. Reduction of the range of structures 14 can be achieved however by increasing the height A of the mandrel 17 so that it is greater than the minimum requirement for some bush sizes and by minimising the number of different mandrel diameter sizes thereby accepting that some bush sizes will have an excess thickness of white-metal applied. This excess thickness can however be machined off and the white-metal recycled.

I claim:

1. A method of applying bearing alloy to bushes, said method comprising fitting the bush to a support structure having on its base an arc formation into which the bush seats, the support structure having a mandrel centralised with respect to the arc formation projecting upwardly from the base and extending above the height of the seated bush by a predetermined amount, externally applying laterally directed infrared heating rays to the support structure and bush for a time interval predetermined by the radial thickness of the bush and the mass of the mandrel, the projection of the mandrel above the bush being predetermined so that the projected area thereof exposed to the infrared heating rays is at least as great as the projected area of the bush exposed to the infrared heating rays, and subsequently pouring molten bearing alloy into the interspace between the bush and mandrel, thereafter applying a coolant to the exterior surface of the bush to solidify the bearing alloy to the bush, and subsequently freeing the metalled bush from the support structure.

2. A method as claimed in claim 1, wherein the infrared heating rays are emitted by an opposed pair of flat surface heaters delivering short or medium wavelength radiation.

3. A method as claimed in either preceding claim, wherein cooling of the bush is undertaken by directing jets of water-based, coolant against the external surface of the bush.

4. A method as claimed in claim 3, wherein the coolant contains water in sufficient quantity to provide controlled directional solidification of the molten alloy by vaporisation of the water.

5. A method as claimed in claim 1, wherein coolant is initially applied to the exterior surface of the bush adjacent the base of the support structure.

* * * * *